United States Patent Office 3,833,546
Patented Sept. 3, 1974

3,833,546
METHOD FOR MAKING POLYETHERIMIDES
Tohru Takekoshi, Scotia, N.Y., and John E. Kochanowski, Pittsfield, Mass., assignors to General Electric Company
No Drawing. Continuation-in-part of application Ser. No. 319,372, Dec. 29, 1972. This application June 22, 1973, Ser. No. 372,743
Int. Cl. C08f 19/00
U.S. Cl. 260—47 CP     12 Claims

ABSTRACT OF THE DISCLOSURE

A process for making polyetherimides is provided by melt polymerizing a mixture of organic diamines and certain aromatic bis(etherdicarbonyl) compounds such as aromatic tetra-carboxylic acids and dianhydrides thereof. The polyetherimides can be made in a continuous manner. Fillers can be incorporated into the polyetherimides to produce high performance composites.

---

This application is a continuation-in-part of our copending application, Ser. No. 319,372, filed Dec. 29, 1972, and assigned to the same assignee as the present invention.

The present invention relates to a melt polymerization process for making polyetherimides based on the reaction between certain aromatic bis(etherdicarbonyl) compounds and organic diamines. The polymerization can be performed in a continuous manner.

Prior to the present invention, polyimides were generally made from polyamide acid intermediates. A dipolar aprotic solvent was required to produce such polyamide acid intermediate before it was converted to the polyimide state. Unlike polyamides, polyimides are intractable and decompose before they can be melted. As a result of solvent removal, the more readily processable polyamide acid can be converted to a film or coating. Polyamide acid solvent removal, however, can cause considerable air pollution.

Offenlegungsschrift 2,153,829 shows that polyimide reaction products can be made in polar solvents at ambient temperatures to a temperature up to about 200° C. Certain dianhydrides or tetra carboxylic acids are reacted with either organic diamines or organic diisocyanates. The dianhydride or tetra-carboxylic acids are derived from bis(3,4-dialkyl-phenoxyphenyl)sulfone by oxidation. The procedure requires long reaction periods, such as up to 24 hours, and employs polluting, expensive polar solvents, such as dimethyl sulfoxide, dimethylformamide, etc. Unlike the earlier intractable polyimides known to the art, these sulfone containing polyimides were found to be soluble in polar solvents at the termination of the reaction.

As shown in our copending application, Ser. No. 319,-371, filed Dec. 29, 1972, and assigned to the same assignee as the present invention, polyetherimide reaction products of aromatic bis(ether anhydride) and organic diamine can be made at elevated temperatures in the presence of organic solvent to produce moldable polyetherimides. Even though the method of Ser. No. 319,371 can be practiced with non-polar organic solvents, which are considerably less expensive than the polar solvents described in Offenlegungsschrift 2,153,829, the use of non-plora organic solvents nevertheless can result in considerable air pollution.

The present invention is based on the discovery that moldable polyetherimides can be made in a continuous manner directly from organic diamines and certain aromatic bis(etherdicarbonyl) compounds, as defined hereinafter, in the absence of organic solvent. These polyetherimide forming ingredients can be melt polymerized at temperatures above 200° C. and preferably at temperatures between 210° C. and 350° C.

There is provided by the present invention, a method for making polyetherimides which comprises, effecting the removal of water of reaction at temperatures up to 350° C. from the melt of a mixture containing as essential ingredients organic diamine of the formula (I) 

and aromatic bis(etherdicarbonyl) compounds selected from organic dianhydrides of the formula, (II) 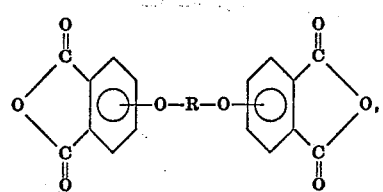

and tetra carboxylic acids of the formula (III) 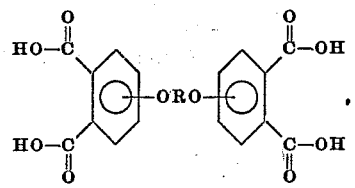

where R is a divalent aromatic organic radical having from 6–30 carbon atoms, $R^1$ is a divalent organic radical selected from R radicals, alkylene radicals having from 2–20 carbon atoms, cycloalkylene radicals, and $C_{(2-8)}$ alkylene terminated polydiorganosiloxane radicals.

Radicals included by R are, for example, aromatic hydrocarbon radicals and halogenated aromatic hydrocarbon radicals, for example, phenylene, tolylene, chlorophenylene, naphthalene, etc., and radicals included by the formula,

where $R^2$ is a divalent aromatic radical having from 6–13 carbon atoms selected from hydrocarbon radicals and halogenated hydrocarbon radicals, and Q is a divalent organo radical selected from

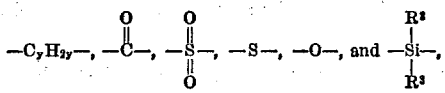

where $a$ is 0 or 1, $y$ is an integer having a value of from 1–5 inclusive, and $R^3$ is a monovalent hydrocarbon radical selected from methyl, phenyl, etc.

Radicals included by $R^1$ are, for example,

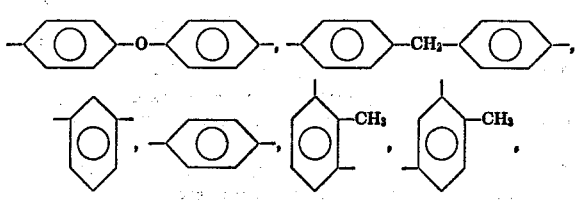

etc.; alkylene radicals such as hexamethylene, etc., cyclohexylene, etc.

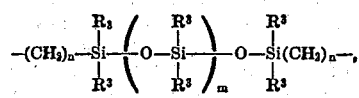

where $R^3$ is as defined above, $m$ is a whole number equal to from 0 to 100 inclusive, and $n$ is −8 inclusive.

Included by the organic dianhydrides of formula II are compounds such as (IV) 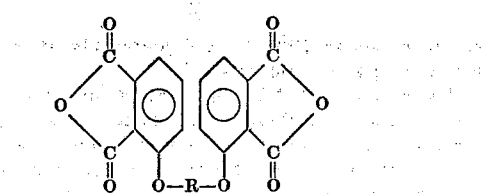

(V) 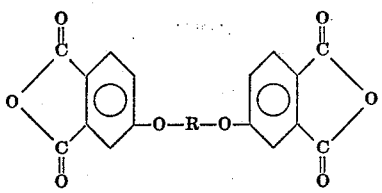

(VI) 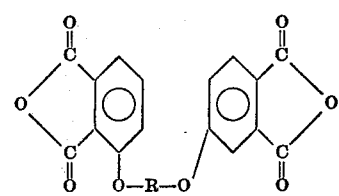

where R is defined above. A preferred form of R is,

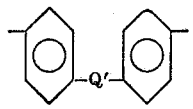

where Q' is selected from

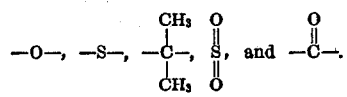

Dianhydrides included by formula IV are for example, 2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3,-dicarboxyphenoxy)diphenyl sulfide dianhydride;
1,4-bis(2,3-dicarboxyphenoxy)benzene dianhydride;
4,4'-bis(2,3-dicarboxyphenoxy)benzophenone dianhydride;
4,4'-bis(2,3-dicarboxyphenoxy)diphenyl sulfone dianhydride; etc.

Dianhydrides included by formulas V and VI are, for example, 2,2-bis[3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy) diphenyl-2,2-propane dianhydride; etc.

In addition to formulas IV-VI above, aromatic bis(ether anhydride)s also included by formula II are shown by Koton, M. M.; Florinski, F. S.; Bessonov, M. I.; Rudakov, A. P. (Institute of Heteroorganic Compounds, Academy of Sciences, U.S.S.R.), U.S.S.R. 257,010, Nov. 11, 1969, Appl. May 3, 1967. In addition dianhydrides are shown by M. M. Koton, F. S. Florinski, Zh Org. Khin, 4(5), 774 (1968).

Included by the tetra-acids of formula III, are compounds selected from the group consisting of (VII) 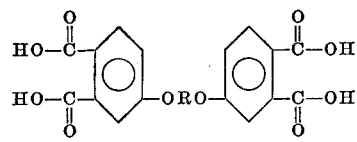

(VIII) 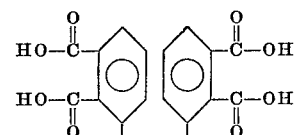

(IX) 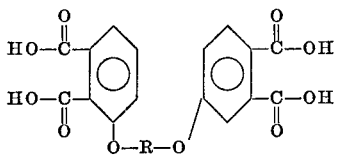

where R is as previously defined.

Some of the aromatic bis(etherdicarbonyl) compounds of formulas II and III are shown in copending application of Darrell Heath and Joseph Wirth, Ser. No. 281,749, filed Aug. 18, 1972, and assigned to the same assignee as the present invention. These compounds can be prepared from the hydrolysis, followed by dehydration of the reaction product of a nitro-substituted phenyl dinitrile with a metal salt of a dihydric phenol compound in the presence of a dipolar aprotic solvent. For example, a benzenoid compound of the formula,

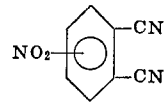

where the $NO_2$ group can be positioned anywhere in the benzene ring, can be reacted in dimethylformamide with an alkali metal salt of a dihydric phenol of the general formula,

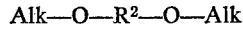

Alk—O—$R^2$—O—Alk where $R^2$ is a divalent aromatic radical and Alk is an alkali metal ion. Various well known procedures can be used to convert the resulting tetranitriles to the corresponding tetra-acids and dianhydrides.

Another procedure for making the aromatic bis(etherdicarboxylic) acids of formula I is shown in copending application of Darrell Heath and Tohru Takekoshi, Ser. No. 346,473, filed Mar. 30, 1973, and assigned to the same assignee as the present invention. An N-substituted nitrophthalimide is reacted with an alkali diphenoxide to produce an intermediate aromatic bis(etherphthalimide). Hydrolysis of the aromatic bis(etherphthalimide) to the tetra-acid salt followed by acidification results in the production of the tetra-acid.

Included by the alkali metal salts of the dihydric phenols used in the above described copending applications Ser. Nos. 281,749 and 346,473, are sodium and potassium salts of the following dihydric phenols, 2,2-bis(2-hydroxyphenyl)propane;
2,4'-dihydroxydiphenylmethane;
bis(2-hydroxyphenyl)methane;
2,2-bis(4-hydroxyphenyl)propane hereinafter identified as "bisphenol-A" or "BPA;"
1,1-bis-(4-hydroxyphenyl)ethane;
1,1-bis-(4-hydroxyphenyl)propane;
2,2-bis-(4-hydroxyphenyl)pentane;
3,3-bis-(4-hydroxyphenyl)pentane;
4,4'-dihydroxybiphenyl;
4,4'-dihydroxy-3,'3-dimethylbiphenyl;
2,2'-dihydroxybenzophenone;
4,4'-dihydroxydiphenyl sulfone 2,4'-dihydroxydiphenyl sulfone
4,4'-dihydroxydiphenyl sulfoxide;
4,4'-dihydroxydiphenyl sulfide; etc.

In addition to the above described "Group A" dihydric phenols, there also can be employed in the present invention, aromatic bis(ether anhydrides) derived from the alkali metal salts of the following "Group B" dihydric phenols:

hydroquinone;
resorcinol;
3,4'-dihydroxydiphenyl methane;
4,4'-dihydroxybenzophenone; and
4,4'-dihydroxydiphenyl ether.

Included by the organic diamines of formula I are, for example, m-phenylenediamine;
p-phenylenediamine;
4,4'-diaminodiphenylpropane;
4,4'-diaminodiphenylmethane;
benzidine;
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-bis(β-amino-t-butyl)toluene;
bis(p-β-amino-t-butylphenyl)ether;
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis(3-aminopropyl)tetramethyldisiloxane;
bis(4-aminobutyl)tetramethyldisiloxane; etc.

In the practice of the invention, a mixture of the aromatic bis(etherdicarbonyl) compound, which hereinafter will signify either the aromatic bis(ether anhydride) of formula II "dianhydride" or the bis(etherdicarboxylic acid of formula III "tetra-acid," and the organic diamine is heated under an inert atmosphere, such as a nitrogen atmosphere to form a homogeneous melt and the water as it is formed is removed therefrom.

The temperature of the melt is maintained above the glass transition temperature of the resulting polyetherimide, but below a temperature of about 400° C. Preferably, the melt polymerization is conducted at a temperature of about between 210° C. to 300° C. The polymerization is facilitated by purging the melt with an inert gas such as nitrogen. It also has been found expedient to employ reduced pressure at the final stage of the polymerization to facilitate removal of water. In instances where tetra-acid is employed, water of reaction, equivalent to two moles of water, per mole of tetra-acid, in excess over that generated by dianhydride will be formed. Agitation of the mixture can be employed in order to facilitate the removal of water. The course of the reaction can be readily followed by the change in melt viscosity of the mixture.

It has been found that substantially equal molar amounts of the organic diamine and the aromatic bis(etherdicarbonyl) compound provide optimum results when the polymerization is conducted in either a batch or continuous manner. In instances where continuous polymerization is desired, standard techniques such as the employment of screw extruder, resin compounding blender, etc. can be employed. Effective results can be achieved with 0.5 to 2.0 mole of organic diamine, per mole of aromatic bis (ether anhydride). Monofunctional organic amines such as aniline, or organic anhydrides such as phthalic anhydride and maleic anhydride provide molecular weight control. Low molecular weight polyetherimide can be employed to form copolymers. From 0.1 to 50 mole percent of comonomers based on the total moles of reactants can be employed.

Polyetherimide having from 2 to 500 and preferably 10 to 50 average repeating units can be formed having an intrinsic viscosity in dimethylformamide at 25° C. of from 0.1 to 1.5. These polyetherimides consist essentially of the following chemically combined units,

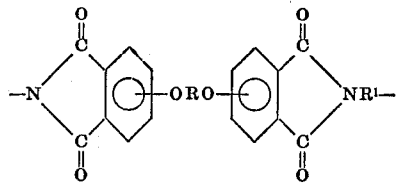

where R and R¹ are as previously defined. These polymers can be blended with various fillers such as silica fillers, glass fibers, carbon whiskers, perlite, etc. The resulting filled compositions can have a proportion of from about 1 part to 70 parts of filler per hundred parts of polyetherimide. The blending of the filler with the polyetherimide can be achieved by adding the filler prior to forming the melt or directly to the melt. Stirring can be effected with a standard agitating means to facilitate blending the ingredients.

In order that those skilled in the art will be better able to practice the invention, the following examples are given by way of illustration and not by way of limitation. All parts are by weight.

EXAMPLE 1

A mixture of 2,2-bis[4-(3,4-dicarboxyphenoxy)phenyl] propane dianhydride (3.0000 parts) and 4,4'-methylenedianiline (1.1418 parts) was heated to 290° C. for one-half hour under nitrogen, and for 1¼ hour in vacuo. The intrinsic viscosity of the product in dimethylformamide was 0.46 dl./g. Based on method of preparation the product was a polyetherimide resulting from the reaction of the aforedescribed dianhydride and methylenedianiline. Its identity was confirmed by elemental analysis found: C, 77.8%; H, 4.5% and N, 4.1%. Calculated for

C, 77.4%; H, 4.4% and N, 4.1%. The infrared spectrum $\lambda_{max}$. 1770, 1714, 1352, 1274 and 1239 cm.⁻¹, also confirmed that the product was a polyetherimide.

The above polyetherimide is molded at 275° C. and a pressure of 5000–10,000 p.s.i. to a finished part. The molded part forms an exact reproduction of the mold.

EXAMPLE 2

A mixture of 2,2-bis[4-(3,4-dicarboxyphenoxy)phenyl] propane dianhydride (3.0000 parts), and 4,4'-methylenedianiline (1.1418 parts) was heated at 290° C. for one-half hour under nitrogen and 1¼ hours under vacuum. The yield of the amber glassy product was 4.0 parts. The intrinsic viscosity of the product was 0.65 dl./g. in dimethylformamide. The thermal decomposition temperature of the product was 450° C. in nitrogen and 420° C. in air as determined by thermal gravimetric analysis. A tough flexible film was cast from a chloroform solution.

Based on method of preparation, the product was a polyetherimide reaction product of the above dianhydride and methylenedianiline.

EXAMPLE 3

A mixture of 2,2 - bis[4 - (2,3 - dicarboxyphenoxy) phenyl]propane dianhydride (6.0000 parts), phthalic anhydride (0.1706 part) and 4,4'-diaminodiphenyl ether (2.4236 parts) was heated to 270° C. under nitrogen for one hour. The yield of the product was 7.49 parts. The product had an intrinsic viscosity in dimethylformamide of 0.34 dl./g. The number average molecular weights of the product was 10,300 and 25,400, respectively.

Based on method of preparation the product was a polyetherimide reaction product of the above dianhydride and diaminodiphenyl ether.

EXAMPLE 4

A mixture of 4,4-diaminodiphenyl ether (1.2152 parts) 4,4'-bis(2,3-dicarboxyphenoxy)diphenyl ether dianhydride (3.0000 parts) was heated to 290° C. under nitrogen with stirring. There was formed 2.8 parts of a tough glassy product. The intrinsic viscosity of the product was 0.53 dl./g. in chloroform. The elemental analysis found: C, 72.4% H, 3.4% calculated for ($C_{40}H_{24}N_2O_8$) is C, 72.7%; H, 3.5%. The thermal decomposition temperature was 480° C. in air is determined by thermo-gravimetric analysis.

Based on method of preparation and elemental analysis the product was a polyetherimide reaction product of the above dianhydride and the diaminodiphenyl ether.

EXAMPLE 5

A mixture of 4,4'-bis(3,4-dicarboxyphenoxy)diphenyl ether dianhydride (3.5228 parts) and hexamethylene diamine (0.8529 part) was heated to 290° C. for one hour with stirring under nitrogen. There was obtained 3.0 parts of a tough amber product. The intrinsic viscosity of the product in chloroform was 0.48 dl./g. The elemental analysis found was: C, 71.6%; H, 4.9% and N, 4.7%. Calculated for ($C_{34}H_{28}N_2O_7$) is C, 70.8%; H, 4.9% and N, 4.9%. The thermal decomposition temperature was 440° C. in nitrogen and 420° C. in air as determined by thermal gravimetric analysis.

Based on method of preparation, the product was a polyetherimide reaction product of the above dianhydride and the alkylene diamine.

EXAMPLE 6

A mixture of 1,4 - bis(2,3 - dicarboxyphenoxy)benzene dianhydride (2,5000 parts) and 4,4'methylenedianilene (1.2320 parts) was heated to 290° C. under nitrogen with stirring for one hour. The yield of product was 2.67 parts. Its intrinsic viscosity in meta-cresol was 0.45 dl./g. The elemental analysis: C, 74.6%; H, 2.8%. Calculated for ($C_{22}H_{10}N_2O_6$) is C, 73.6%; H, 2.9%. The infrared spectrum was taken from a tough flexible film cast from metacresol: $\lambda_{max.}$ 1772, 1715, 1378, 1249 and 1885 cm.$^{-1}$. The thermal decomposition temperature was 480° C. in nitrogen and 480° C. in air as determined by thermal gravimetric analysis.

Based on method of preparation, the above described elemental analysis and spectra, the product was a polyetherimide reaction product of the above dianhydride and methylenedianiline.

EXAMPLE 7

A mixture of 4,4'-bis(3,4-dicarboxyphenoxy)diphenylsulfide dianhydride (2.5571 parts) and bis(4-aminobutyl) tetramethyldisiloxane (1.4259 parts) was heated under nitrogen with stirring to 260° C. The yield of product was 3.0 parts. Its intrinsic viscosity in chloroform was 0.55 dl./g. The infrared spectrum taken from a tough flexible film cast from chloroform was $\lambda_{max.}$ 1762, 1702, 1440, 1390, 1230 and 1164 cm.$^{-1}$. The thermal decomposition temperature of the product was 450° C. in nitrogen and 410° C. in air as determined by thermal gravimetric analysis.

Based on method of preparation and the above spectral data, the product was a polyetherimide reaction product of the above dianhydride and the above diaminosiloxane.

EXAMPLE 8

A mixture of 2,2-bis[4-(3,4-dicarboxyphenoxy)phenyl] propane dianhydride (50.00 parts) and 4,4'-methylenedianiline (18.6722 parts) was heated to 270° C. under nitrogen with stirring for 1½ hours. The intrinsic viscosity of the resulting product in dimethylformamide was 0.52 dl./g. The product was extruded at 275° C. by use of a screw extruder. Molded samples were made of the extruded material. The molded samples had a tensile strength of 11,300 p.s.i. and the elongation was 6.7%.

Based on method of preparation the product was a polyetherimide reaction product of the above dianhydride and methylenedianiline.

EXAMPLE 9

A mixture of 2,2-bis[4-(2,3-dicarboxyphenoxy)phenyl] propane dianhydride (1.5000 parts) and 2,2-bis[4-(3,4-dicarboxyphenoxy)phenyl]propane dianhydride (1.5000 parts) and 4,4'-methylenedianiline (1.1418 parts) was heated with stirring to 290° C. under nitrogen for 45 minutes and in vacuo for 15 minutes. The yield of product was 3.2 parts. Its intrinsic viscosity in chloroform was 1.37 dl./g. The infrared spectrum of the product was $\lambda_{max.}$: 1768, 1700, 1360, 1250, 1078 cm.$^{-1}$.

Based on method of preparation and its IR spectrum, the product was a polyetherimide reaction product of the above dianhydrides and methylenedianiline.

EXAMPLE 10

A mixture of 1,4 - bis(3,4-dicarboxyphenoxy)benzene dianhydride (2.2902 parts) and bis(4-aminobutyl)tetramethyldisiloxane (1.5587) parts was heated to 270° C. with stirring for 45 minutes under nitrogen and for 15 minutes in vacuo. The yield of product was 2.92 parts. The intrinsic viscosity of the product in chloroform was 0.37 dl./g. Its infrared spectrum was : $\lambda_{max.}$ 1762, 1700, 1462, 1432, 1224, 1190 cm.$^{-1}$. The thermal decomposition temperature of the product was 430° C. in nitrogen and 390° C. in air as determined by thermal gravimetric analysis.

Based on method of preparation and spectral data, the product was a polyetherimide reaction product of the above dianhydride and bis(aminodisiloxane).

EXAMPLE 11

A mixture of 2,2-bis[4-(2,3-dicarboxy)phenoxy]propane dianhydride (8.099 parts) and 2,4-toluenediamine (1.8628 parts) was heated under nitrogen at 240° C. for 15 minutes. The melt was further heated at 275° C. under vacuum for 0.5 hours. The resulting product melt was cooled and dissolved in about 100 parts of chloroform. The solution was poured in methanol to yield 8.80 parts of the product.

Based on method of preparation, the product was a polyetherimide reaction product of the above dianhydried and toluenediamine.

EXAMPLE 12

A mixture of 2,2 - bis[4 - (2,3 - dicarboxyphenoxy) phenyl]propane dianhydride (6.690 parts) and hexamethylenediamine (1.494 parts) was heated at 225° C. under vacuum for 0.5 hour. On cooling, an amber colored, tough product was obtained at a 93.4% yield. The product was analyzed for $C_{37}H_{32}N_2O_6$; found, C, 74.7 and H, 5.5; calc. C, 74.0 and H, 5.4.

Based on method of preparation and elemental analysis the product was a polyetherimide reaction product of the above dianhydride and alkylene diamine. It is molded to a finished part in accordance with the procedure of Example 1.

EXAMPLE 13

The tetra-acid, 2,2 - bis[3,4 - dicarboxyphenoxy) phenyl]propane was prepared from the corresponding bisimide by base hydrolysis followed by acidification of the corresponding salt with a mineral acid. The aforementioned bisimide was prepared from the corresponding N-phenyl-4-nitrophthalimide with a disodium salt of bisphenol-A in accordance with the following procedure:

A mixture of 29.8 g. (0.131 mol) of bisphenol-A, 10.44 g. of sodium hydroxide in the form of a 50% aqueous solution, 250 cc. of dimethyl sulfoxide, and 66 cc. of toluene was stirred in a nitrogen atmosphere at reflux for 7 hours. Final drying was effected by refluxing the toluene over a recirculating trap filled with calcium hydride. The toluene was removed by distillation and the reaction mixture was cooled to 60° C. Then 70.0 g. (0.26 mol) of N-phenyl-4-nitrophthalimide and 250 cc. of dimethyl sulfoxide were added; the resulting solution was stirred at 60° C. for 45 minutes. There was added 25 cc. of glacial acetic acid; the reaction mixture was then diluted with 1400 g. of water. A fine solid separated; it was isolated by filtration, washed with water, and dried. After recrystallization from acetonitrile and from benzene there was obtained 44.4 g. of white needles, m.p. 214° C.

Analysis.—Calcd. for $C_{43}H_{30}N_2O_6$: C, 77.0; H, 4.51; N, 4.18. Found: C, 76.7; H, 4.5; N, 4.1.

Based on method of preparation and elemental analysis the product was 2,2 - bis[4 - (N - phenylphthalimid - 4-oxy)phenyl]propane.

A mixture of 60.2 g. of 2,2 - bis[4 - (N - phenylphthalimid-4-oxy)phenyl]propane, 57.37 g. of an aqueous 50% sodium hydroxide solution, and 350 cc. of water was heated for 2.5 hours at 160–175° C. under 150 p.s.i. pressure. The mixture was then steam distilled for 45 minutes. The aqueous residue was acidified with hydrochloric acid. A product separated from the aqueous solution, which was washed with water and recrystallized from 50% acetic acid. There was obtained 32.9 g. of product; m.p. 208–216° C. (decomposed).

Analysis.—Calcd. for $C_{31}H_{24}O_{10}$: C, 66.9; H, 4.3. Found: C, 66.5; H, 4.4.

Based on method of preparation and elemental analysis, there was obtained 2,2-bis[4-(3,4-dicarboxyphenoxy)phenyl]propane.

Substantially equal molar amounts of the above tetra-acid and 4,4'-diaminophenyl ether were heated at 290° C. under a nitrogen atmosphere for 0.5 hour and under vacuum for an additional 0.5 hour. There was obtained a polymer which was soluble in dimethylformamide and which precipitated in methanol. The yield of polymer was 94% and its intrinsic viscosity in dimethylformamide was 0.49. Based on method of preparation the polymer was a polyetherimide reaction product of the above tetra-acid and organic diamine.

EXAMPLE 14

A mixture of 2,2 - bis[4 - (3,4 - dicarboxyphenoxy) phenyl]propane (6.02 parts) and 4,4'-methylenedianiline (1.94 parts) was heated at 275° C. with stirring for 30 minutes under nitrogen atmosphere and cooled. Tensile test bars were made by compression molding at 650° F. The tensile strength was 13,500 p.s.i. and the elongation was 8%.

EXAMPLE 15

A mixture of 43.12 parts of finely divided 2,2-bis[4-(3,4 - dicarboxyphenoxy)phenyl]propane dianhydride and 16.26 parts of 4,4'-diaminodiphenyl ether is continuously fed into a screw extruder maintained at 275° C. Water vapor is continuously vented out through an inlet opening and an amber colored product is continuously extruded through an orifice. The residence time in the extruder is 10 minutes. The resulting extruded product is then continuously fed into a second extruder maintained at a temperature of 300–325° C. Product is continuously extruded from the second extruder after a residence time of about 10 minutes. Based on method of preparation and infrared spectrum the product is a polyetherimide reaction product of the above-described organic bis(ether anhydride) and organic diamine. Molded bars are prepared from the polyetherimide and found to have a tensile strength of 12,500 p.s.i. and an elongation of 35%.

EXAMPLE 16

The tetra-acid, 2,2 - bis[4 - (2,3 - dicarboxyphenoxy) phenyl]propane was prepared from the corresponding bisimide in accordance with the procedure as described in Example 13. There was employed a sodium hydroxide solution at 170° C. (150 p.s.i.) to effect bisimide hydrolysis. Elemental analysis confirmed the identity of the tetra-acid: Calc. for $C_{31}H_{24}O_{10}$; C, 66.9%; H, 4.3%; found, C, 66.5%; H, 4.5%. In preparing the bisimide, N-phenyl-3-nitrophthalimide was used.

A mixture of the above tetra-acid (6.02 parts) and 1.94 parts of 4,4'-methylene dianiline was heated at 275° C. with stirring for 30 minutes under a nitrogen atmosphere followed by cooling the resulting mixture. The infrared spectrum was taken from a tough flexible film cast from metal-cresol: $\lambda_{max}$. 1772, 1715, 1378, 1249 and 1885 cm.$^{-1}$. The thermal decomposition temperature was 480° C. in nitrogen and 480° C. in air as determined by thermal gravimetric analysis.

Although the above examples are limited to only a few of the very many polyetherimides which can be made in accordance with the practice of the invention, it should be understood that the present invention is broadly directed to the use of organic diamine of formula I and aromatic bis(ether dicarbonyl) compounds of formula II under conditions broadly set forth in the description preceding these examples.

What we claim as new and desire to secure by Letters Patent of the United States is:

1. A method for making polyetherimide which comprises effecting the removal of water of reaction by stirring, with an inert gas purge, or by reducing pressure at temperatures up to 400° C. from the melt of a mixture containing as essential ingredients organic diamine of the formula

$H_2NR^1NH_2$, and tetra-carboxylic acids of the formula

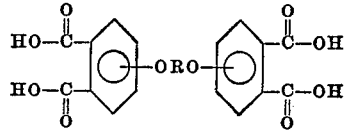

where R is a divalent aromatic organic radical having from 6–30 carbon atoms, $R^1$ is a divalent organic radical selected from R radicals, alkylene radicals having from 2–20 carbon atoms, cycloalkylene radicals, and $C_{(2-8)}$ alkylene terminated polydiorganosiloxane radicals.

2. A method for making polyetherimide in accordance with claim 1, where there is present in said melt at least two different tetracarboxylic acids.

3. A method for making polyetherimide in accordance with claim 1, where there is present in said melt at least two different organic diamines.

4. A method in accordance with claim 1, where the tetracarboxylic acid has the formula,

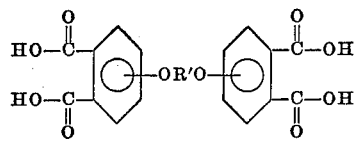

where R⁴ is

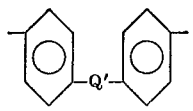

and Q' is a member selected from the class consisting of

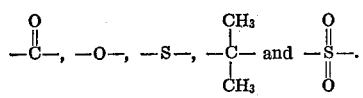

5. A method in accordance with claim 1, where the tetra-acid has the formula

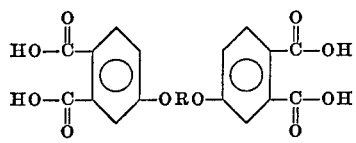

6. A method in accordance with claim 1, where the tetra-acid has the formula

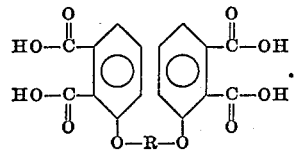

7. A method in accordance with claim 1, where the tetra-acid has the formula

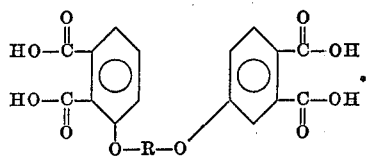

8. A method in accordance with claim 1, where inert gas is employed to facilitate removal of water of reaction.

9. A method in accordance with claim 1, where a vacuum is employed to facilitate removal of water of reaction.

10. A method in accordance with claim 1, when the melt contains a filler.

11. A method in accordance with claim 1 wherein a mixture of 2,2-bis[4-(3,4-dicarboxyphenoxy)phenyl]propane and 4,4'-diaminodiphenylether is employed.

12. A method in accordance with claim 1 wherein a mixture of 2,2-bis[4-(3,4-dicarboxyphenoxy)phenyl]propane and 4,4'-methylene dianiline is employed.

References Cited
UNITED STATES PATENTS 3,573,132    3/1971    Ducloux et al. ____ 260—78 TF
3,649,601    3/1972    Critchley et al. ____ 260—78 TF MELVYN I. MARQUIS, Primary Examiner U.S. Cl. X.R.

260—32.4, 32.6 R, 33.4 R, 33.8 R, 37 N, 46.5 E, 49, 78 TF; 264—331